United States Patent [19]

Hirata et al.

[11] 4,411,479
[45] Oct. 25, 1983

[54] DOUBLE ROW ANGULAR CONTACT BALL BEARING WITH ONE-PIECE OUTER RING AND ONE-PIECE INNER RING

[75] Inventors: Minoru Hirata, Kosugi; Tsutae Takeda, Toyama, both of Japan

[73] Assignee: Kabushiki Kaisha Fujikoshi, Toyama, Japan

[21] Appl. No.: 309,456

[22] Filed: Oct. 7, 1981

[30] Foreign Application Priority Data

Oct. 17, 1980 [JP] Japan ................. 55-144399

[51] Int. Cl.³ ............................................. F16C 19/08
[52] U.S. Cl. .................................. 308/195; 308/189 R
[58] Field of Search ............... 308/195, 201, 193, 194, 308/190, 188, 189 R

[56] References Cited

U.S. PATENT DOCUMENTS

| 1,146,271 | 7/1915 | Mossig et al. | 308/195 |
| 2,075,280 | 3/1937 | Green | 308/189 R |
| 3,532,401 | 10/1970 | McKee | 308/195 |
| 4,240,681 | 12/1980 | Stolz et al. | 308/189 R |

FOREIGN PATENT DOCUMENTS

| 47-5609 | 3/1972 | Japan | 308/201 |
| 50-109339 | 8/1975 | Japan | 308/201 |
| 53-71401 | 6/1978 | Japan | 308/189 R |

*Primary Examiner*—Stuart S. Levy
*Assistant Examiner*—Thomas R. Hannon
*Attorney, Agent, or Firm*—Michael N. Meller

[57] ABSTRACT

A double row angular contact ball bearing having a one-piece inner ring and a one-piece outer ring and containing therebetween a first row of a larger number of balls inserted in a maximum-type manner and a second row of a lesser number of balls inserted in a manner similar to the Conrad-type manner. The balls of each of the first and second rows are held by two separate cages. The raceway of the outer ring for the second row of balls is an angular contact raceway laterally open at one side, whereas the other raceway of the outer ring for the first row of balls is cut out from the bottom thereof in a substantially radially outward direction and then laterally toward an end face of the outer ring to form an inner cylinder bore surface. By such an arrangement, it is possible to insert a greater number of balls into the second row of balls than was the case in the prior art bearing of this type, resulting in increased load capacity, longer life, and improved reliability.

6 Claims, 9 Drawing Figures (a) ZEROTH STEP → (b) FIRST STEP →

→ (c) SECOND STEP → (d) THIRD STEP

DOUBLE ROW ANGULAR CONTACT BALL BEARING WITH ONE-PIECE OUTER RING AND ONE-PIECE INNER RING

BACKGROUND OF THE INVENTION

The present invention relates to a double row angular contact ball bearing having a one-piece inner ring and a one-piece outer ring and adapted for use mainly as an automobile wheel bearing.

Since this type of bearing has the advantages of reduced mounting man-hours, elimination of internal clearance adjusting operation, stability of quality after mounting, reduced size, reduction in weight, etc., recently a wheel bearing has been developed in which either one or both of inner and outer rings 2' and 1' are formed with flanges 16 and 17 as shown in FIG. 9. In the case of a bearing used with an automobile axle, the bearing is subjected to a thrust load, moment, etc., in addition to the usual radial load and consequently the bearing is required to have a capacity to withstand these loads and a long life. In particular, since large thrust load and moment are imposed on the balls in one of the raceway pairs during a turning, the load capacity of the balls in the raceway pair subjected to large loads must be increased. In addition, a difference is caused in the number of orbital revolutions between the balls in the two raceway pairs and it is necessary to ensure that the bearing conforms satisfactorily with the situation.

To meet these requirements, many improved bearings have been proposed including a Conrad-type ball bearing (Japanese Laid-Open Patent Application No. 47-5609) produced by making an outer ring and an inner ring eccentric, inserting balls into the crescent-shaped spaces formed by the raceway tracks of the outer and inner rings, bringing the outer and inner rings back onto the same axis to arrange the balls at equal spaces and then inserting a one-piece cage from the non-flanged side to hold in place the balls of the two raceway pairs, a bearing (Japanese Laid-Open Patent Application No. 50-109339) incorporating a one-piece cage having a complex shape and made from a special material to cope with the difference in the number of orbital revolutions between the two rows of balls and a bearing (Japanese Laid-Open Patent Application No. 53-71401) in which the number of balls inserted in one of two raceway pairs is greater than that of the other raceway pairs and an outer ring which has been preliminarily divided in a plane perpendicular to the axis is made into a one-piece outer ring by pins after the completion of the assemblage. However, these prior art bearings have the disadvantages of being insufficient in load capacity, being incapable of properly responding to the difference in the number of orbital revolutions, being difficult to manufacture, being difficult to maintain the desired processing accuracy and so on.

Still another type of bearing has been proposed (U.S. Pat. No. 3,532,401) in which balls of the second row of a lesser number of balls are inserted by tilting a one-piece outer ring and a one-piece inner ring with reference to each other and the bearing is so designed that a large number of balls is inserted in one of the raceway pairs in a maximum-type manner and that the inclination of the outer ring with respect to the inner ring is determined by inclining the outer ring against the axis passing through the center of one of the inserted maximum-type balls. As a result, while the ball forming the center of rotation of the outer ring is always held in contact with the bottom of the outer ring raceway track and the other balls move away from the outer ring raceway track as soon as the outer ring inclines in such a manner that the balls move away increasingly from the raceway track as the inclination of the outer ring increases, thus increasing the previously mentioned crescent shaped space, this has the effect of increasing the axial deviation of the positional relation between the other outer ring raceway track having no balls inserted and the inner ring raceway track, with the result that the number of balls inserted in the other outer ring raceway track becomes insufficient and the desired load capacity is not ensured, thus making the rated load of the bearing not necessarily satisfactory and failing to ensure a highly reliable life of the bearing on the whole.

SUMMARY OF THE INVENTION

With a view to overcoming the foregoing deficiencies in the prior art double row angular contact ball bearings of the type having a one-piece outer ring and a one-piece inner ring, it is an object of the present invention to provide an improved double row angular contact ball bearing having one-piece inner and outer rings in which one of two rows of balls consists of balls inserted in a maximum-type manner and the other row consists of balls inserted in a manner similar to the Conrad-type manner and the number of the balls in the latter row is greater than in the case of the prior art bearings.

It is another object of the present invention to provide such bearing in which the number of balls inserted in a manner similar to the Conrad-type manner is increased to increase the load capacity of the tracks.

It is still another object of the invention to provide such bearing which is designed to reduce the concentrated load caused inside the outer ring during the use and which is easy to manufacture.

It is still another object of the invention to provide such bearing which accomplishes the above mentioned objects without being impeded by any measuring inaccuracy or processing inaccuracy.

It is still another object of the invention to provide such bearing which is so designed that there is no danger of damage to balls during the assembling of the bearing.

In accordance with the present invention there is thus provided a double row angular contact ball bearing comprising an inner and outer ring each of which is composed of an undivided one-piece raceway ring having a pair of raceway grooves and two rows of balls inserted between the inner and outer rings with a predetermined contact angle and retained in separate cages. The first row adapted to be subject to a high load includes the maximum number of balls inserted in the raceway grooves in a maximum-type manner and the second row includes the balls inserted in the raceway grooves in a manner similar to the Conrad-type manner. The raceway of the outer ring for the second row of balls is an angular contact raceway laterally open at one side throughout the circumferential extent of the outer ring, and the other raceway of the outer ring for the first row of balls is cut out from the bottom thereof in a substantially radially outward direction and then laterally toward an end face of the outer ring to form an inner cylinder bore surface, and wherein the bore surface has a diameter greater than the diameter of the bottom of the outer ring raceway track at least by an amount corresponding to more than 5% of the diameter of the balls, so that during the assembly of the bearing the first row of balls and the inner ring in contact therewith are able to be displaced tiltingly radially outwardly with respect to the outer ring to provide a greater space for inserting the balls of the second row without causing excessive axial misalignment between the second pair of raceways for the second row of balls, thereby allowing the second pair of raceways to receive a greater number of balls of the second row. The joining portion of the inner cylinder bore surface and the outer ring raceway track bottom may be a plane surface crossing the bore surface at right angles or they may be joined together by a conical or arcuate surface. Also, the outer ring raceway for the first rows of balls may be cut out from the point outwardly deviated from the raceway track bottom by a small distance $\Delta l$ of the order of a processing inaccuracy. Still further, it is designed to provide a relation $\beta_o \leq \beta \leq 90°$, where $\beta$ is an angle formed by the inner cylinder bore surface and the conical surface connecting the bore surface with the raceway track bottom and $\beta_o$ is an angle formed by the tangent of the surface of the ball contacting position of the cut-out and the bore surface.

The foregoing and other objects as well as the characteristic features of the invention will become more apparent and more readily understandable in view of the following description and the appended claims when read in conjunction with the accompanying drawings.

DESCRIPTION OF THE PREFERRED EMBODIMENTS

The present invention will now be described in greater detail with reference to the illustrated embodiments.

Figure 1:
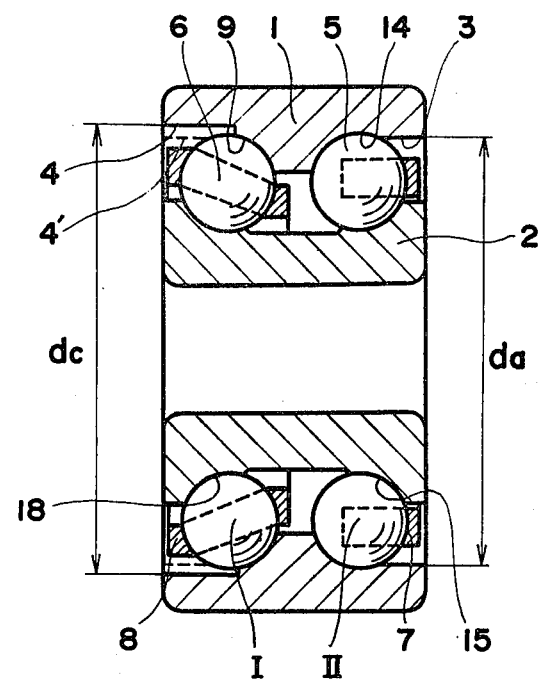
FIG. 1 is a longitudinal sectional view of an embodiment of the invention.
Figure 2:
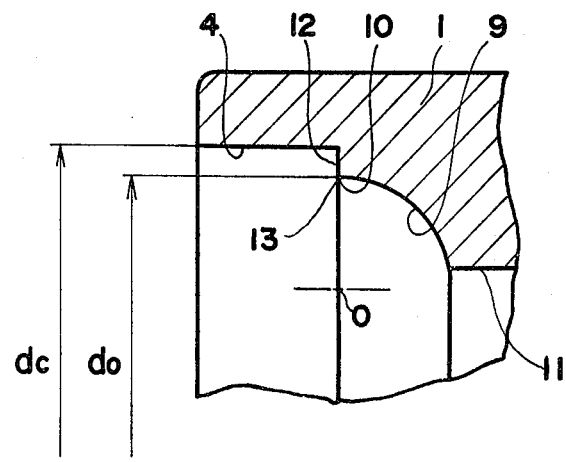
FIG. 2 is an enlarged partial sectional view of FIG. 1.
Figure 9:
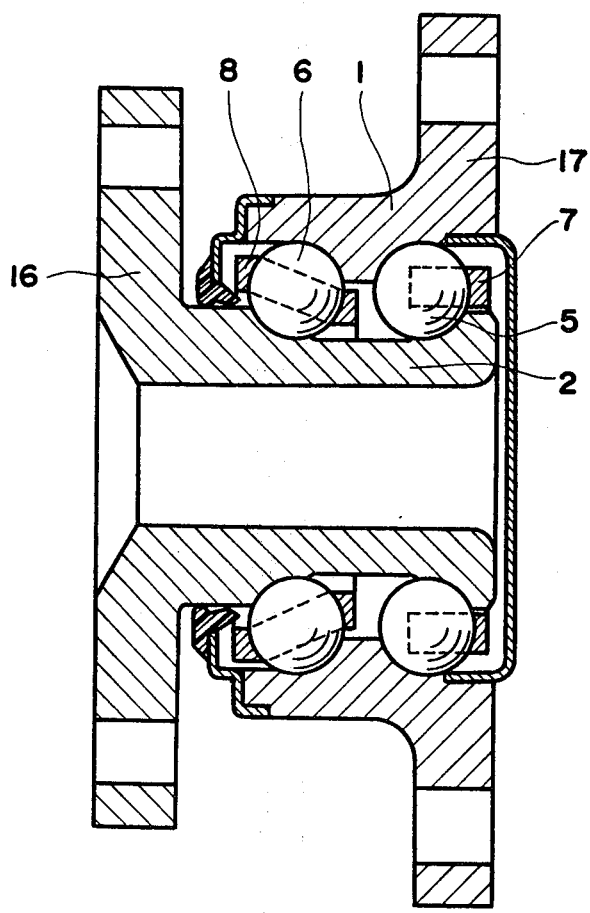
FIG. 9 is a longitudinal sectional view of a prior art bearing.

Referring to FIGS. 1 and 2, two rows of balls or ball rows I and II are provided between a one-piece outer ring 1 and a one-piece inner ring 2 and the rows respectively include large numbers of balls 5 and 6 which are rotatably inserted with a predetermined angle of contact in place. The outer ring 1 is formed with an angular contact raceway track (14) for the row II laterally open at one side throughout the circumferential extent of the outer ring 1 to form a counter bore 3 of the type usually formed in prior art angular contact bearing. Also, the outer ring 1 is formed with another raceway track 9 for the row I, and the raceway track 9 is cut out from the raceway track bottom 10 (FIG. 2) in a substantially radially outward direction and then laterally toward an end face of the outer ring to form an inner cylinder bore surface 4. The diameter dc of the bore surface 4 is made greater than the diameter do of the raceway track bottom at least by an amount corresponding to more than 5% of the diameter of the balls 5 and 6 and that its raceway track 9 for the ball row I is cut out outwardly to provide an incomplete groove. The flanges of the inner and outer rings 1 and 2 as shown in FIG. 9 may be provided with the bearing of FIG. 1, but they are not shown.

The balls 6 making up the ball row I are inserted in a so-called maximum-type manner in a greater number than in the case of the other ball row II. The ball rows I and II are also provided respectively with separate cages 7 and 8 which respectively hold the balls 5 and 6 at equal spaces in the ball rows I and II. In this way, even if a difference in the number of orbital revolutions occurs between the ball rows, free rolling of the balls is ensured and the occurrence of any failure due to damage to the cages is prevented.

FIG. 2 shows an enlarged partial sectional view of the embodiment of FIG. 1. The outer ring raceway track 9 of the ball row I is cut out at a raceway track bottom 10 so that the raceway track 9 is connected to the inner cylinder bore surface 4 of the greater diameter dc than the raceway track diameter do by a plane surface 12 crossing the bore surface 4 at right angles. Numeral 13 designates a cut-out position of the raceway track 9, 0 the center of curvature of the raceway track 9, and 11 an inner raceway track shoulder. If the diameter of the inserted balls is represented by Da, then the dimensional relation between the diameters do and dc is given by $$dc - do > 0.05 \times Da \tag{1}$$

It is to be noted that in fact the joining portion of the cut-out position 13 and the surface 12 must of course be formed with a very small chamfer so as to prevent any damage to the balls during the assembling of the bearing, although the chamfer is not shown in FIG. 2 (and other figures as well).

To ensure the maximum possible effects of the present invention, ideally the raceway track bottom 10 and the raceway track cut-out position 13 must be accurately collocated. The reason is that with the cut-out position 13 being deviated toward the bore surface 4 from the raceway track bottom 10, if the outer ring 1 is correspondingly inclined during the assembling, the outer and inner ring raceway tracks 14 and 15 for the ball row II will be axially misaligned with each other. If the raceway tracks 14 and 15 are misaligned in the opposite direction, the contact ellipse of the balls overlaps the cut-out position 13. However, in the actual manufacture, the occurrence of any measuring inaccuracy and processing inaccuracy is unavoidable and it is difficult to exactly align the raceway bottom 10 and the cut-out position 13, thus allowing them to misalign in either direction. However, the occurrence of any misalignment within the range of ordinary manufacturing inaccuracy will not deteriorate the effects of the present invention appreciably. However, in order that the contact ellipse which will be described later may be prevented from overlapping the cut-out position 13, it is possible from the standpoint of safety to manufacture so that the cut-out position 13 is misaligned toward the inner cylinder bore surface 4 by an amount corresponding to a measuring inaccuracy or manufacturing inaccuracy $\Delta l$ with respect to the raceway track bottom 10.

Next, the method of assembling the bearing will be described.

Figure 3:
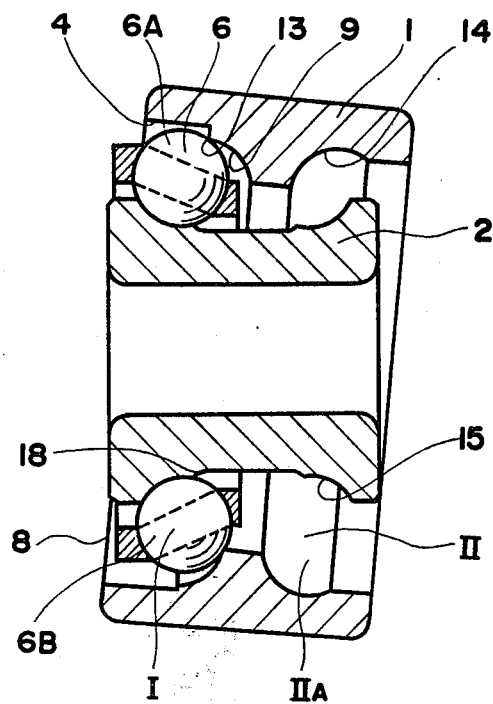
FIG. 3 is a sectional view showing the assembling condition of the bearing according to the invention.
Figure 4:
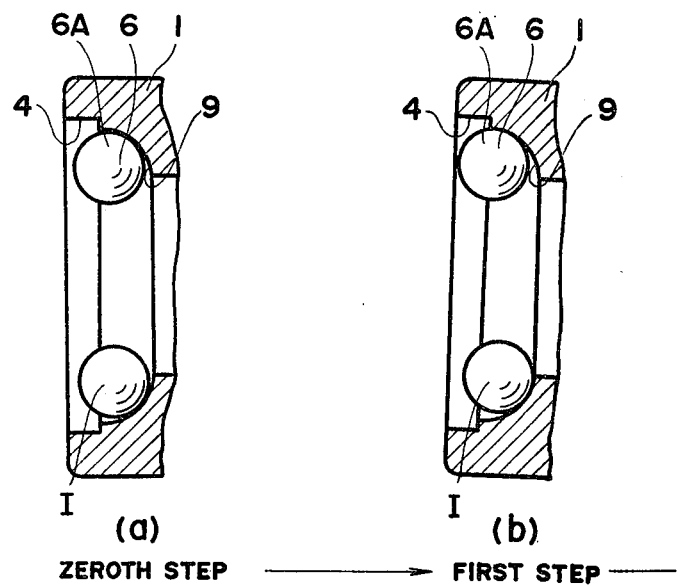
FIG. 4 shows a plurality of schematic diagrams (a), (b), (c) and (d) each showing the relation between the balls and the outer ring during the assembling of the bearing.
Figure 4:
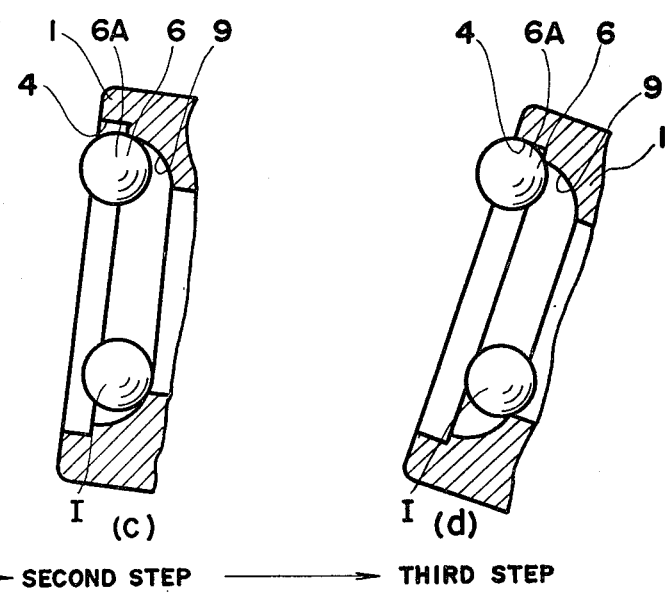

The balls 6 and the cage 8 are first inserted in the maximum-type manner in the inner ring raceway track for the ball row I and then the outer ring 1 is put in place. Then, with the ball 6A and the ball 6B positioned opposite to the ball 6A by way of the axis being always held in contact with the outer ring raceway track 9, the outer ring 1 is displaced tiltingly and then radially outwardly with respect to the inner ring 2 as shown in FIG. 3 and FIG. 4 to provide a greater space for inserting the balls of the row II without causing excessive axial misalignment between the outer and inner raceway tracks 14 and 15, thereby allowing the insertion of a greater number of balls 5 of the row II than was the case in prior art bearings and the balls 5 are inserted in a crescent shaped space $II_A$ formed on the ball row II side and enclosed by the outer ring raceway track 14 and the inner ring raceway track 15. Then the inclined outer ring 1 is restored into the normal position and the balls 5 are arranged at equal spaces. Finally, the cage 7 is axially inserted. A feature of the thus assembled double row angular contact ball bearing is that the balls of the ball row I are inserted in the maximum-type manner, and a lesser number of balls than are inserted in the ball row I are inserted in the ball row II, and consequently the bearing of this invention has a large load capacity on the whole as compared with the prior art so-called double row angular contact ball bearing in which the balls of two rows are arranged in the so-called Conrad-type manner or in the manner disclosed in the above U.S. Pat. No. 3,532,401 wherein the balls of the second row of less number are inserted by only just tilting or inclining the outer ring with respect to the first row of balls and the inner ring.

In accordance with the present invention, the balls of the ball row II are inserted with the outer ring 1 displaced tiltingly and then radially outwardly with respect to the inner ring 2 and consequently the number of the balls 5 of the ball row II can be increased as the relative displacement in a radial direction of the outer ring 1 is increased. In other words, as shown quantitatively in FIG. 3, of the balls 6 of the ball row I, if the ball 6A positioned at the top of the tilting of the outer ring 1 is deviated from the raceway track 9, the crescent shaped space $II_A$ defined by the inner ring raceway track 15 and the outer ring raceway track 14 for the ball row II can be correspondingly increased without causing excessive misalignment between the outer and inner raceway tracks 14 and 15, with the resulting increase in the number of balls inserted in the space $II_A$.

This process will be described in greater detail with reference to FIG. 4. FIG. 4 shows only the ball row I and the associated parts of FIG. 3 and the inner ring 2 and the cage 7 are not shown. More specifically, during the assembling of the bearing the positional relation between the relative displacement of the outer ring 1 and the balls 6 proceeds from the 0th step (a) to the 3rd step (d). The 0th step shows the condition where the inclination of the outer ring 1 is zero. On the assumption that the diameter da of the counterbore 3 is equal to the diameter dc of the bore surface 4' (phantom line) shown in FIG. 1, the third step (d) cannot take place so that the number of balls inserted to make up the ball row II will be decreased correspondingly. On the other hand, after the 3rd step (d) has been completed, any further increase in the inclination of the outer ring 1 increases the space $II_A$ but the amount of misalignment between the outer and inner ring raceway tracks is increased so that the number of balls inserted is not increased. Thus, any excessive inclination of the outer ring 1 has no significance.

Figure 8:
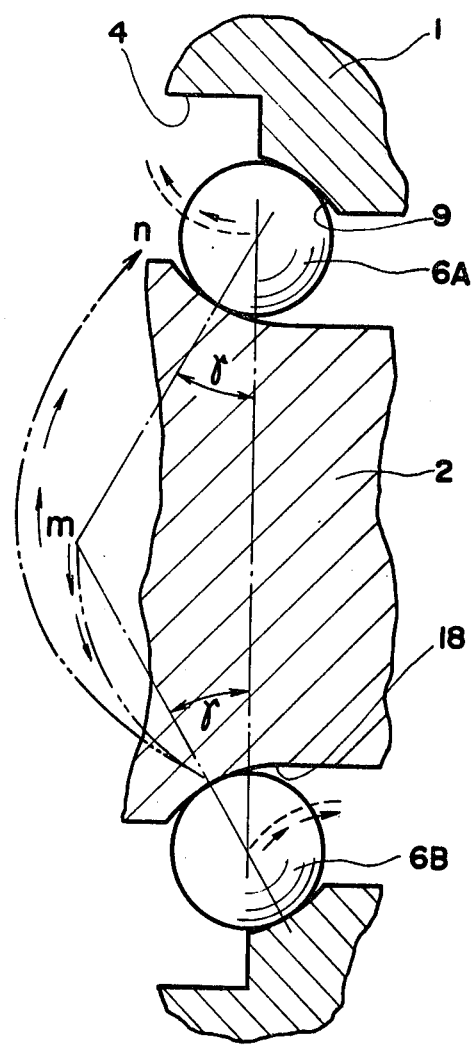
FIG. 8 is a diagram useful for explaining the relative displacement of the inner and outer rings and the directions of movement of the balls during the assembling of the bearing.

More specifically, if the outer and inner rings 1 and 2 are inclined as shown in FIG. 4, as shown in FIG. 8, the centers of the balls 6A and 6B in the ball row I move in the directions of the arrows along the broken lines with respect to the outer ring raceway track 9. In other words, the ball 6A and the adjacent balls deviate from the outer ring raceway track 9 at an early opportunity so that the axial relative misalignment between the outer ring raceway track 14 and the inner ring raceway track 15 for the ball row II is correspondingly reduced and the amount of eccentricity is increased, thus increasing the crescent shaped space $II_A$ for the ball row II. Here, it is to be noted that the center of rotation of the outer ring relative displacement with respect to the inner ring 2 is not fixed at one point but its position is shifted from moment to moment so that its trace becomes as shown by the two-dot chain lines in FIG. 8 and it moves along the arrows from a point m to a point n. The point m represents the pressure cone apex of the bearing and $\gamma$ represents the nominal angle of contact.

Figure 5:
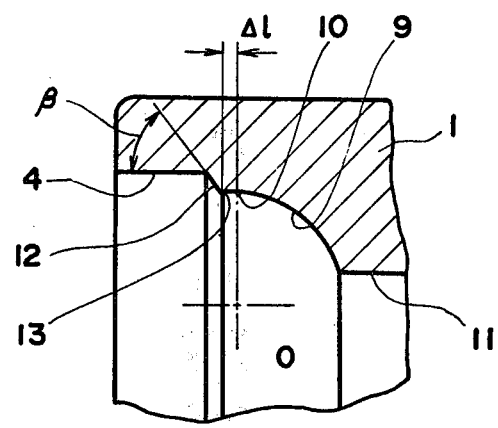
FIG. 5 is an enlarged partial sectional view of another embodiment of the invention.

FIG. 5 shows a case where the bearing was manufactured such that the cut-out position 13 was deviated from the position of the raceway bottom 10 toward the inner cylinder bore surface 4 by an amount corresponding to the measuring inaccuracy or processing inaccuracy $\Delta l$. Also, the surface 12a interconnecting the raceway cut-out position 13 and the bore surface 4 is in the form of a conical surface which makes an angle $\beta$ with the bore surface 4 and this shape is more desirable due to its effect of reducing the concentrated stress caused within the outer ring 1a during the use of the bearing and making the processing easier.

Figure 6:
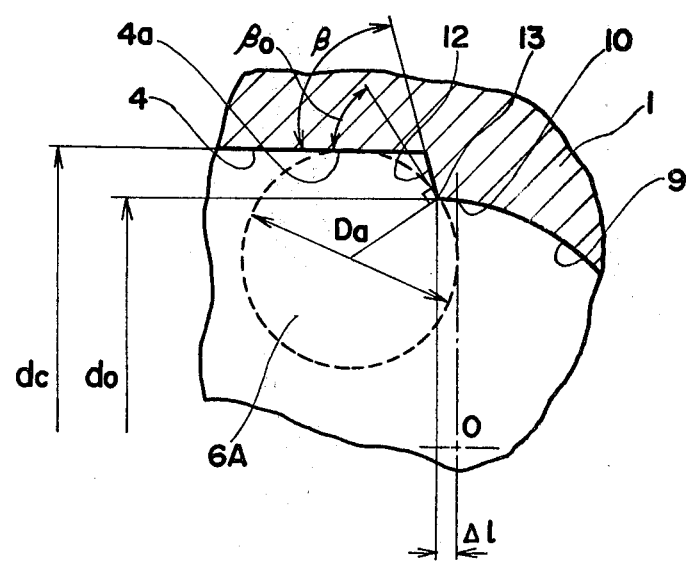
FIG. 6 is a diagram useful for explaining the relation between the ball and the outer ring.

However, there is a limit to the angle $\beta$ and the limit will be described with reference to FIG. 6 showing the angle $\beta$ in enlarged form. Where the diameter dc of the surface 4 is selected to be minimum within the limits of the equation (1), if the ball 6A having the diameter Da and shown by the broken line is simultaneously contacted with the cut-out position 13 and a position 4a on the surface of the bore surface 4, the angle $\beta$ formed by the surface 12a and the bore surface 4 must be greater than the angle $\beta o$ formed by the shoulder 4 and the tangent of the ball surface contacting the cut-out position 13. As a result, the angle $\beta$ must lie within the following range $$\beta o \leq \beta \leq 90° \qquad (2)$$

The case where the angle $\beta$ is 90° corresponds to FIG. 2 and the angle $\beta$ may of course be selected to be greater than 90°. However, the angle $\beta$ of greater than 90° does not have much significance since such an angle only tends to make the manufacture of the bearing difficult and cause a concentrated load while in use.

Figure 7:
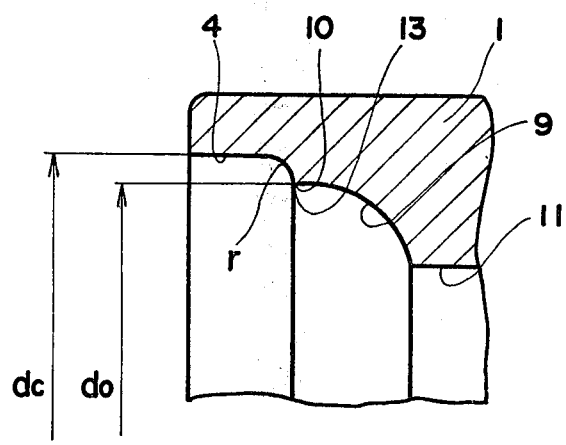
FIG. 7 is an enlarged partial sectional view showing still another embodiment of the invention.

Also, as shown in FIG. 7, the cut-out position 13 and the bore surface 4 may be interconnected by an arcuate surface $\gamma$ in place of the plane surface or the conical surface 12 or 12a.

In accordance with the present invention, by virtue of the fact that the outer ring raceway groove of the balls inserted in the maximum-type manner is cut out from near the raceway bottom toward the end face to form an incomplete groove and that the inner cylinder bore surface formed at the inner peripheral side edge of the outer ring has a diameter increased at least by an amount corresponding to 5% of the ball diameter or over, the number of balls to be inserted to make up the ball row II not adapted to be subject to a high load can be surely increased at least by one as compared with the prior art bearings of this type. In accordance with the standard design, the number of balls of the ball row I is about 10 to 12 and that of the ball row II is about 5 to 6. Thus, in view of these circumstances, the fact that the number of balls of the ball row II is increased by one in accordance with the invention has the effect of increasing the load capacity of the ball row II by about 10% and thereby increasing the calculated life by about 35%. Thus, by virtue of the fact that not only the ball row I has a satisfactory life but also the ball row II has a longer life, the reliability of the bearing on the whole is remarkably improved. Further, a compact designing is made possible due to elimination of the use of any snap ring after assembling the divided part of the inner ring. Still further, the invention has a great advantage in that the bearing provided according to the invention is inexpensive and has a high degree of accuracy due to its simplified assembling process.

The above-described embodiment of the invention represents only a preferred embodiment of the invention and it is of course possible to make various changes and modifications to the embodiment without departing from the basic technical concept of the invention.

We claim:

1. In a double row angular contact ball bearing comprising a one-piece inner ring, a one-piece outer ring disposed concentric with the inner ring, first and second rows of balls disposed between said inner and outer rings with a predetermined angle of contact, and first and second cages for respectively holding said first and second rows of balls, the number of balls comprising said first row, inserted between a first raceway track of said inner ring and a first raceway track of said outer ring adapted to be subject to a higher load, being greater than the number of balls of said second row, inserted between a second raceway track of said inner ring and a second raceway track of said outer ring, said balls of said first row being inserted in a maximum-type manner, wherein said second raceway track of said outer ring is an angular contact raceway laterally open at one side throughout the circumferential extent of said outer ring, and said first raceway track of said outer ring is cut out from the bottom thereof in a substantially radially outward direction and then laterally toward an end face of said outer ring to form an inner cylinder bore surface, and said bore surface has a diameter greater than the diameter of the bottom of said first raceway track of said outer ring at least by an amount corresponding to more than 5% of the diameter of said balls, such that during assembly of said bearing, said first row of balls and said inner ring in contact therewith are able to be displaced tiltingly and then radially outwardly with respect to said outer ring to provide a greater space for inserting the balls of said second row without causing excessive axial misalignment between said second raceway track of said inner ring and said second raceway track of said outer ring, thereby enabling a greater number of balls to be included in said second row.

2. A bearing according to claim 1, wherein said inner cylinder bore surface and the bottom of said first raceway track of said outer ring are connected with each other by way of a plane surface crossing the bore surface at a right angle.

3. A bearing according to claim 1, wherein said inner cylinder bore surface and the bottom of said first raceway track of said outer ring are connected with each other by way of a conical surface.

4. A bearing according to claim 1, wherein said inner cylinder bore surface and the bottom of said first raceway track of said outer ring are connected with each other by way of an arcuate surface.

5. A bearing according to claim 1, wherein said first raceway track of said outer ring is cut out, from the point outwardly deviated from the bottom of said first raceway track by a small distance $\Delta l$ of the order of a processing inaccuracy, in a substantially radially outward direction to form a surface connecting said bore surface with the bottom of said first raceway track.

6. A bearing according to claim 3, wherein $\beta$, which is the angle formed by said inner cylinder bore surface and said conical surface, is in the range $\beta o \leq \beta \leq 90°$, $\beta o$ being the angle formed by the tangent of the surface of the ball contacting the position of said cut-out and said bore surface.

* * * * *